United States Patent
Haist et al.

(10) Patent No.: US 11,997,394 B2
(45) Date of Patent: May 28, 2024

(54) SYSTEMS AND METHODS FOR CALIBRATING AND OPERATING IMAGING SYSTEMS WITH ILLUMINATION EXTERNAL TO A HOST

(71) Applicant: ZEBRA TECHNOLOGIES CORPORATION, Lincolnshire, IL (US)

(72) Inventors: Paul D. Haist, Toronto (CA); Matthew Lawrence Horner, Sound Beach, NY (US); Christopher P. Klicpera, Westbury, NY (US); Thomas J. Stevenson, Wixom, MI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 78 days.

(21) Appl. No.: 17/956,298

(22) Filed: Sep. 29, 2022

(65) Prior Publication Data
US 2024/0114237 A1    Apr. 4, 2024

(51) Int. Cl.
| | |
|---|---|
| *H04N 23/56* | (2023.01) |
| *G01N 21/88* | (2006.01) |
| *H04N 23/661* | (2023.01) |
| *H04N 23/72* | (2023.01) |
| *H04N 23/74* | (2023.01) |

(52) U.S. Cl.
CPC ......... *H04N 23/72* (2023.01); *G01N 21/8806* (2013.01); *H04N 23/56* (2023.01); *H04N 23/661* (2023.01); *H04N 23/74* (2023.01); *G01N 2021/8838* (2013.01)

(58) Field of Classification Search
None
See application file for complete search history.

(56) References Cited

U.S. PATENT DOCUMENTS

| | | | |
|---|---|---|---|
| 2012/0081566 A1 | 4/2012 | Cote et al. | |
| 2013/0120636 A1 | 5/2013 | Baer | |
| 2017/0374265 A1 | 12/2017 | Finlow-Bates | |
| 2019/0394385 A1 | 12/2019 | Osawa | |
| 2021/0195088 A1* | 6/2021 | Allen | H04N 23/74 |
| 2021/0364447 A1* | 11/2021 | Naruse | G06V 10/772 |

OTHER PUBLICATIONS

International Search Report and Written Opinion for International Application No. PCT/US2023/32399 dated Jan. 24, 2024.

* cited by examiner

*Primary Examiner* — Paul M Berardesca
(74) *Attorney, Agent, or Firm* — Yuri Astvatsaturov

(57) ABSTRACT

At least some embodiments are directed to systems and methods to optimize relative signal delays in vision systems having illumination assemblies separate from a host. In an example embodiment there is a system that includes a host device having, an imaging assembly coupled to the host device and operable to capture image data, and an illumination assembly coupled to the host device and operable to provide illumination. The system is configured such that the host transmits, to the imaging assembly, a series of exposure signals causing the imaging assembly to capture a series of frames and transmits, to the illumination assembly, a series of illumination signals causing the illumination assembly to provide the illumination as a series of strobes. Thereafter the host evaluate each frame to identify a peak-brightness frame and from that, based on a corresponding illumination signal, determines an appropriate relative signal delay for future operations.

21 Claims, 5 Drawing Sheets

SYSTEMS AND METHODS FOR CALIBRATING AND OPERATING IMAGING SYSTEMS WITH ILLUMINATION EXTERNAL TO A HOST

BACKGROUND

When triggering external devices like cameras or illumination assemblies from a host, the delay between the host sending the trigger signal and the external device reacting could be unknown. This is because the trigger signal normally has to traverse a series of wired or wireless communication means combined with a likelihood of one or more gateways. Delays introduced by these channels are generally not known, and are thus difficult to anticipate for.

Additionally, due to manufacturing tolerances, similar or same devices can also have varying response times for various subsystem components.

In light of these problems, there continues to be a need for improved systems and methods that help overcome the problems posed by the uncertainty that is created by the aforementioned delays.

SUMMARY

In an embodiment, the present invention is a system, comprising: a host device having a processor; an imaging assembly communicatively coupled to the host device, the imaging assembly operable to capture image data representative of an environment appearing within a field of view (FOV) of the imaging assembly; an illumination assembly communicatively coupled to the host device, the illumination assembly operable to provide illumination over at least a portion of the FOV; and a memory storing instructions that, when executed by the processors, cause the processors to: (i) transmit, to the imaging assembly, a series of exposure signals causing the imaging assembly to capture a series of frames; transmit, to the illumination assembly, a series of illumination signals causing the illumination assembly to provide the illumination as a series of strobes; (ii) evaluate each of the series of frames to identify a peak-brightness frame, the peak-brightness frame having a peak brightness from the series of frames; (iii) determining a peak-brightness illumination signal that corresponds to the peak-brightness frame; and (iv) associating at least one characteristic of the peak-brightness illumination signal with a subsequent activation of the imaging assembly.

In another embodiment, the present invention is a method for calibrating and/or operating an imaging assembly having an illumination assembly associated therewith, comprising: transmitting, from a host that is communicatively coupled to the imaging assembly and the illumination assembly, a first exposure control signal to the imaging assembly and a first illumination control signal to the illumination assembly, there being a first time-differential between the transmitting the first exposure control signal and the transmitting the first illumination control signal; responsive to receiving the first exposure control signal, capturing, by the imaging assembly, a first image data; transmitting, from the host, a second exposure control signal to the imaging assembly and a second illumination control signal to the illumination assembly, there being a second time-differential between the transmitting the second exposure control signal and the transmitting the second illumination control signal; responsive to receiving the second exposure control signal, capturing, by the imaging assembly, a second image data; transmitting, from the host, a third exposure control signal to the imaging assembly and a third illumination control signal to the illumination assembly, there being a third time-differential between the transmitting the third exposure control signal and the transmitting the third illumination control signal, each of the first time-differential, the second time-differential, and the third time-differential being different from each other of the first time-differential, the second time-differential, and the third time-differential; responsive to receiving the third exposure control signal, capturing, by the imaging assembly, a third image data; determining which of a first image data, a second image data, and a third image data has a peak-brightness; responsive to the first image data having the peak-brightness, associating the first time-differential with a set time-differential; responsive to the first image data having the peak-brightness, associating the first time-differential with the set time-differential; responsive to the first image data having the peak-brightness, associating the first time-differential with the set time-differential; and transmitting, from the host, a fourth exposure control signal to the imaging assembly and a fourth illumination control signal to the illumination assembly, there being the set time-differential between the transmitting the fourth exposure control signal and the transmitting the fourth illumination control signal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
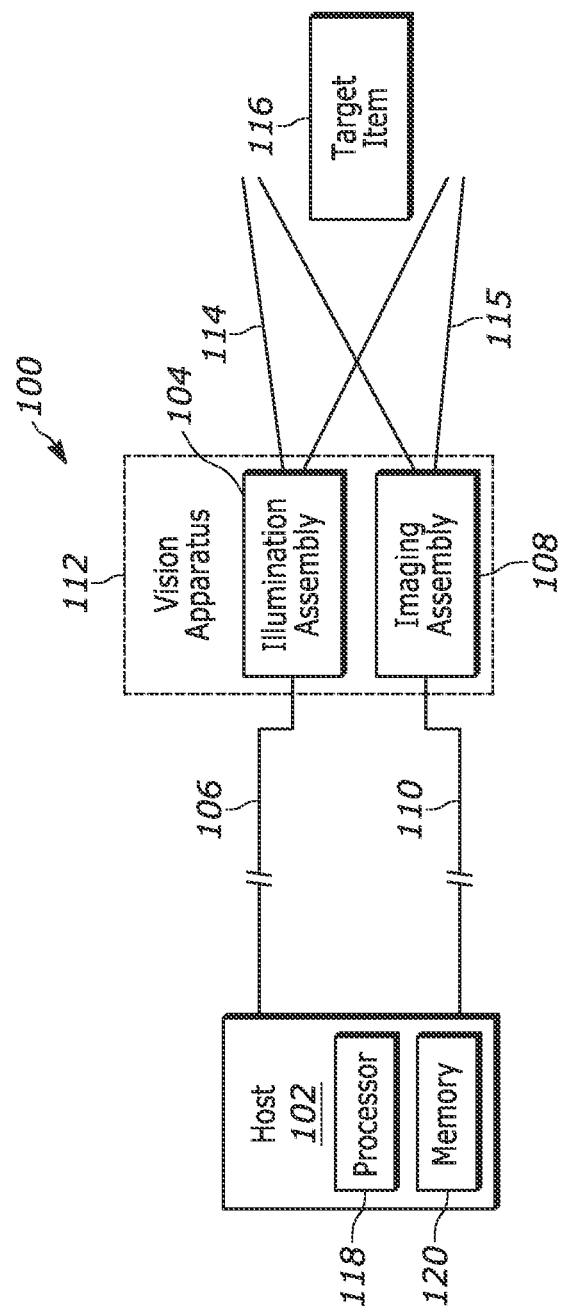
FIG. 1 is an exemplary block diagram of vision system according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Referring now to FIGS. 1, shown therein is a block diagram of an example vision system 100 for imaging targets over a field of view. This exemplary system includes a host component 102 that could take a form of a computer operable to execute an application that can provide illumination/imaging trigger signals downstream. The host 102 is communicatively coupled to an illumination assembly 104 via communication means 106 and to imaging assembly 108 via communication means 110. Communication means 106, 108 between the host 102 and either of the illumination assembly 104 and/or the imaging assembly 108 can take any form that is within the scope of those of ordinary skill in the art. In preferred embodiments, host 102 is respectively connected directly or indirectly to the illumination assembly 104 and the imaging assembly 108 via wired connectivity using, for example, Ethernet, USB, serial, CoaXPress, Fire-Wire, Camera Link, etc. While a direct connection can be employed, communication means 106, 108 can also include gateways, switches, routers, PLCs, and so on.

In some embodiments, the illumination assembly 104 and the imaging assembly 108 can be housed in a single housing of a vision apparatus 112. In other embodiments, the illumination assembly 104 and the imaging assembly 108 are housed separately without a common device housing.

Generally speaking, system 100 is employed to capture image data in a digital format and transmit this data (in its raw or processed form) to the host for further processing. To achieve sufficient image quality, the illumination assembly 104 is used to provide illumination that is sufficient to illuminate a target object during image capture. The illumination assembly 104 may be any assembly that is operable to emit electromagnetic radiation within the portion of the electromagnetic spectrum that is perceived by the human eye, or that falls within either the ultraviolet or infrared portion of the spectrum. Components responsible for this emission may include LEDs, lasers, halogen lamps, etc. Additionally, the illumination assembly may include a single light source (e.g., a single LED), multiple light sources (e.g., multiple LEDs), or multiple banks of light sources (e.g., multiple banks of LEDs, for example, or differing colors). Depending on the application, the illumination assembly can include one or more filter(s) like a polarizing or a color filter.

To operate the illumination assembly 104, the host 102 transmits an illumination signal (also referred to as an illumination control signal) via communication means 106 to the illumination assembly 104 which, by way of internal wiring and/or processing, causes the illumination assembly 104 to activate its light source(s) and provide illumination over an illumination field of view (FOV) 114 for a predetermined duration. The actual activation of the illumination source can be achieved in a number of ways. For example, an illumination signal in a form of a pulse lasting t millisecond (ms) may be transmitted from the host directly to the illumination assembly 104 such that the current forming the pulse drives the illumination source for the t millisecond. In another example, the signal lasting t millisecond may be transmitted by the host where this signal activates a physical or a logical relay for t millisecond such that a drive current is passed through the relay to the illumination source for t millisecond. In yet another embodiment, the illumination assembly 104 may include an activation-duration register which can be programmed with a value that defined the illumination duration (e.g., t millisecond). In this instance, the host 102 can transmit a trigger signal to the illumination assembly 104 to activate its illumination source for the duration which is defied by the value programmed into the activation-duration register.

Turning now to the imaging assembly 108, in various example embodiment the assembly includes an image sensor(s) (also referred to as an imaging sensor or imager) that is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by a lens group over an imaging FOV 115 along an imaging axis that is normal to the substantially flat image sensor. The lens group is operative for focusing the return light onto the array of image sensors (also referred to as pixels) to enable the image sensor, and thereby the imaging assembly, to form a digital image. In particular, the light that impinges on the pixels is sensed and the output of those pixels produce image data that is associated with the environment that appears within the FOV (which can include the target 116). This image data may be processed by an internal controller/processor (e.g., by being sent to a decoder which identifies and decodes decodable indicia captured in the image data) and/or it may be sent upstream to the host 102 for processing thereby.

The activation of the imaging sensor of the imaging assembly 108 can be controlled, at least in part, from the host 102 via the communication means 110. In some instances, a pulse of duration y millisecond may be sent by the host directly to the imaging assembly 108 whereby the current that forms the pulse drives the imaging sensor to capture image data over a frame. In other instances, a pulse having a duration y millisecond and transmitted by the host 102 can be routed to a logical and/or physical relay whereby that relay permits a drive current to be sent to the image sensor for a duration of y millisecond. In still other embodiment, the imaging assembly 108 and/or its corresponding imaging sensor can include a register whereby the value written to said register is associated with the duration (e.g., a duration of y millisecond) over which the sensor will capture image data for a single frame in response to a trigger signal. In this instance, in response to receiving an exposure trigger signal (also referred to as an exposure signal or an exposure control signal), the image sensor is activated to capture image data for a duration of y millisecond over a frame.

Figure 2:
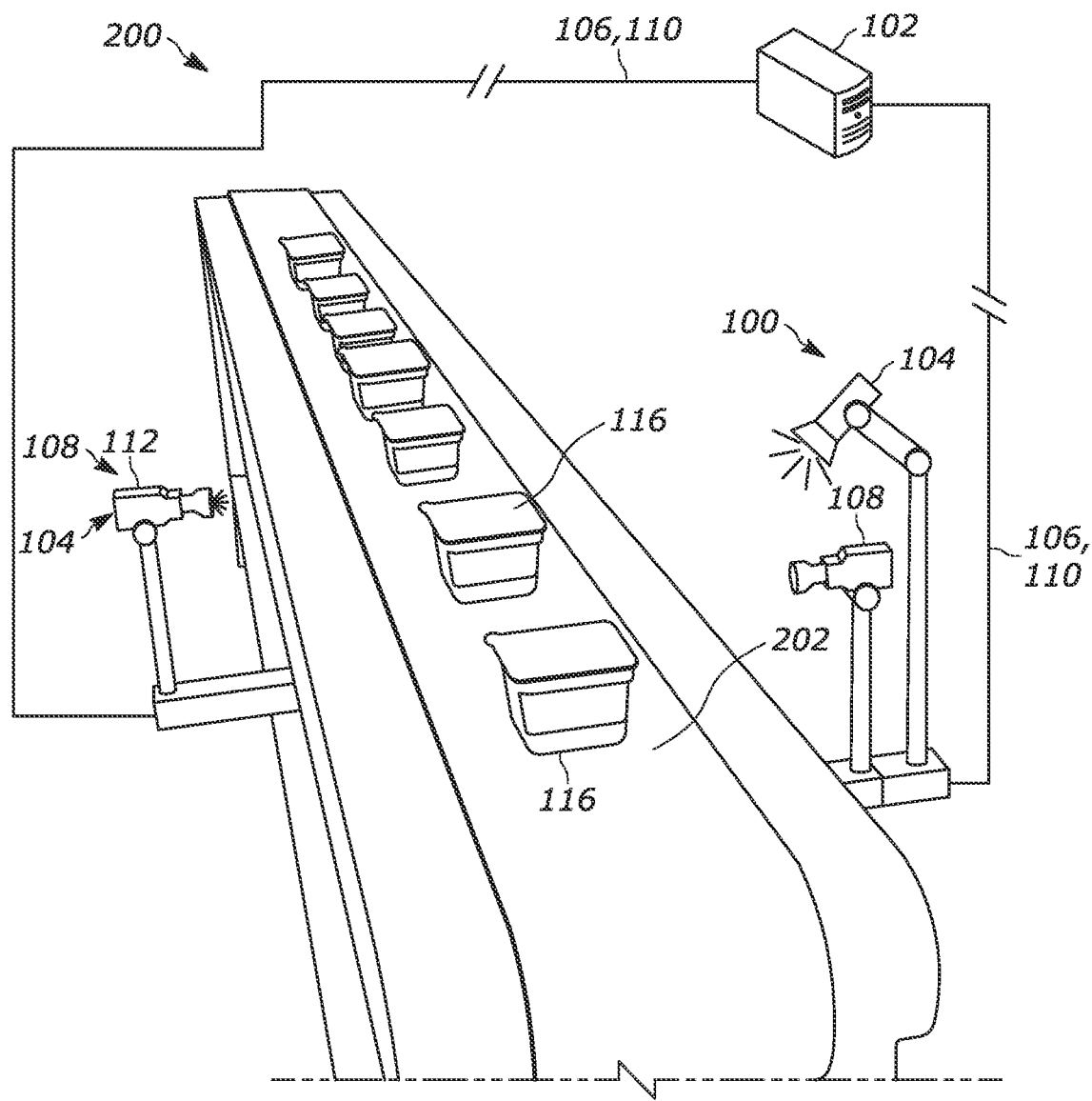
FIG. 2 is an example setting in which the system of FIG. 1 can be implemented.

Turning now to FIG. 2, system 100 may be implemented as an exemplary vision system 200 which may be configured to capture images of target objects 116 on a conveyor belt 202 in an industrial setting such as a factory, warehouse, assembly line, etc. In environments such as this, objects 116 can be expected to pass through the vision apparatus' imaging FOV in a relatively speedy fashion and/or capturing certain details on objects 116 may be a requirement. This requires that the illumination assembly 104 activate and provide adequate illumination over the imaging FOV during the image capture phase of the imaging assembly 108. While constant-on illumination (and particularly statically constant-on illumination) may be implemented, this approach includes various drawbacks. For instance, illumination assembly 104 may have a relatively high-powered illumination source that would generate a significant amount of heat. Such heat could lead to premature device failure, temporary shutdowns, or improper operations of other components—especially if the illumination assembly is packaged with other components as part of the vision apparatus 112—that could be affected by excessive heat. Moreover, illumination provided over an entire frame-capture duration may provide too much light, oversaturating the resulting image or creating hot-spots within the resulting image. Such degradation in quality could negatively affect further image processing and/or details extraction. As a result, illumination provided by the illumination assembly 104 is coordinated with the image capture operations of the imaging assembly 108 whereby the illumination assembly 104 is activated, in a pulsed manner, for at least a portion of the duration during which the imaging assembly 108 acquires a frame of image data. Such coordination between the operation of the imaging assembly and the illumination assembly can be achieved by executing, via the processor 118, instructions stored in the memory 120 (see FIG. 1) whereby the instructions cause the processor (also referred to as a controller) to control various aspects of the host and/or the illumination assembly 104, imaging assembly 108, and/or vision apparatus 112.

While one example of the system 100 is illustrated in FIG. 2 as being integrated into a vision apparatus 112 (shown on the left of the conveyor 202), another example (shown on the right of the conveyor 202) illustrates the vision system 100 with the illumination assembly 104 and the imaging assembly 108 being arranged as separate devices. As exemplified herein, using this arrangement may, for example, be advantageous in instances where external illumination may result in better illumination of the target 116, where illumination assembly 104/imaging assembly 108 may have physical constraints, where modularity is preferred, or where various illumination options are required for various applications.

As described previously, due to reasons like various communication protocols employed on communication means 106 and 110, the different communication lengths between communication means 106 and 110, different processing times for responding to trigger signals across the imaging assembly 104 and imaging assembly 108, and so on, an illumination control signal and an exposure control signal transmitted at the same time from the host 102 to, respectively, the illumination assembly 104 and imaging assembly 108 could result in an undesired activation sequence of the assemblies such that the illumination assembly may activate too early or too late relative to the imaging assembly.

Figure 3:
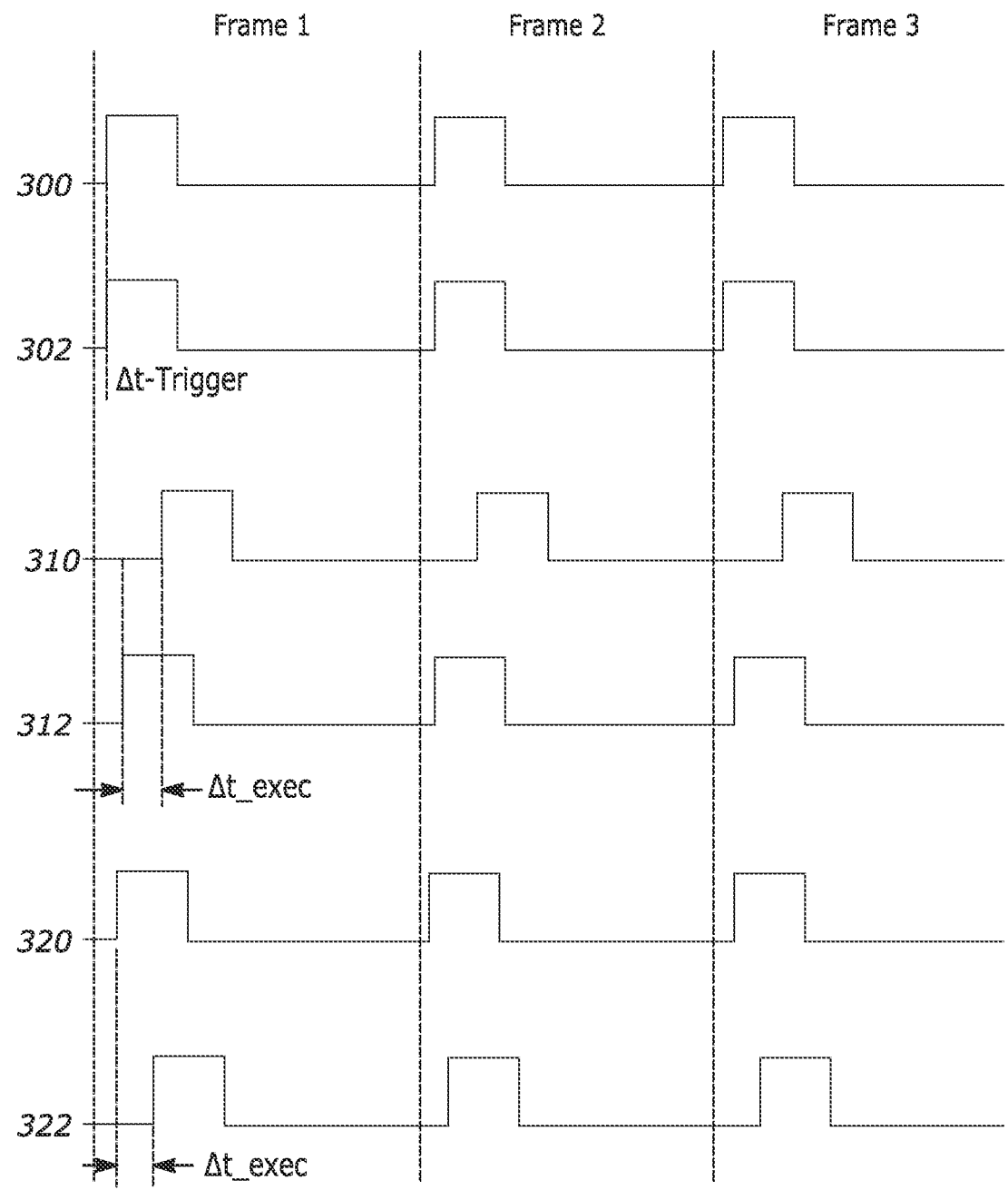
FIG. 3 illustrates possible examples of exposure and illumination pulses transmitted by a host and possible responses to such transmissions.

For example, referring to FIG. 3, shown there is an exemplary series of illumination control pulses 300 and exposure control pulses 302 as they would appear at the output of the host 102. As shown, the time difference between the generation (also referred to as transmission) of the illumination pulses 300 and the exposure pulses 302 (A trigger) is negligible. However, by the time that these pulses reach their destination, this time difference may have significant effects on the performance. For instance, if the illumination pulses take longer to reach the illumination assembly than the exposure pulses, the actual activation of the illumination assembly 310 and the activation of the imaging assembly 312 may be uncoordinated whereby the time difference between each respective activation for each frame is separated by a time $\Delta t\_exec$. In this instance, the imaging assembly will begin to expose prior to the illumination assembly activating, causing a portion of the resulting image to be not illuminated (particularly if using a rolling shutter imaging sensor) or the overall image to be under-illuminated (particularly if using global shutter imaging sensor). Similarly, if the illumination pulses cause the illumination assembly to activate 320 prior to the activation of the imaging assembly 322, the same detrimental effect may be observed.

This discrepancy may be remedied by implementing a tuning application on the host 102. As noted previously, host 102 can be configured to execute an application that, at least partially, controls the illumination assembly 104 and the imaging assembly 108. In some embodiments, this application can be user-configurable whereby a user sets up and executes one or more vision jobs which requires the imaging assembly 108 to capture image data, such as image data associated with the industrial setting of FIG. 2 and target items 116, and process this image data to arrive at a desired result-analysis. To improve lighting performance of the illumination assembly relative to the operation of the imaging assembly, the application can include a sub-application (also referred to as a module) or it may call on a separate application to tune the relative delay between illumination signals transmitted on communication means 106 to the illumination assembly 104 and the exposure signals transmitted on communication means 110 to the imaging assembly 108.

Figure 4:
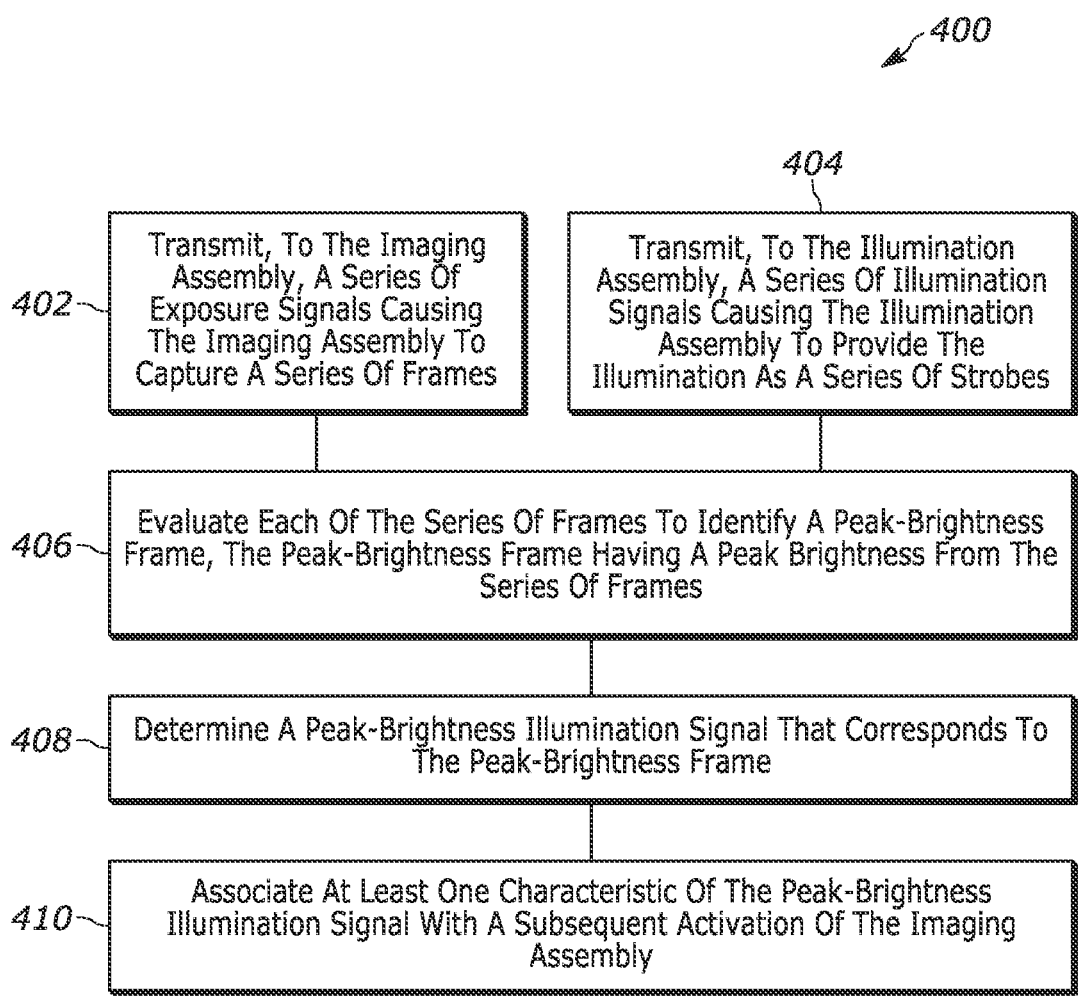
FIG. 4 is an example process flow for implementing tuning methods in accordance with example embodiments of the present invention.
Figure 5:
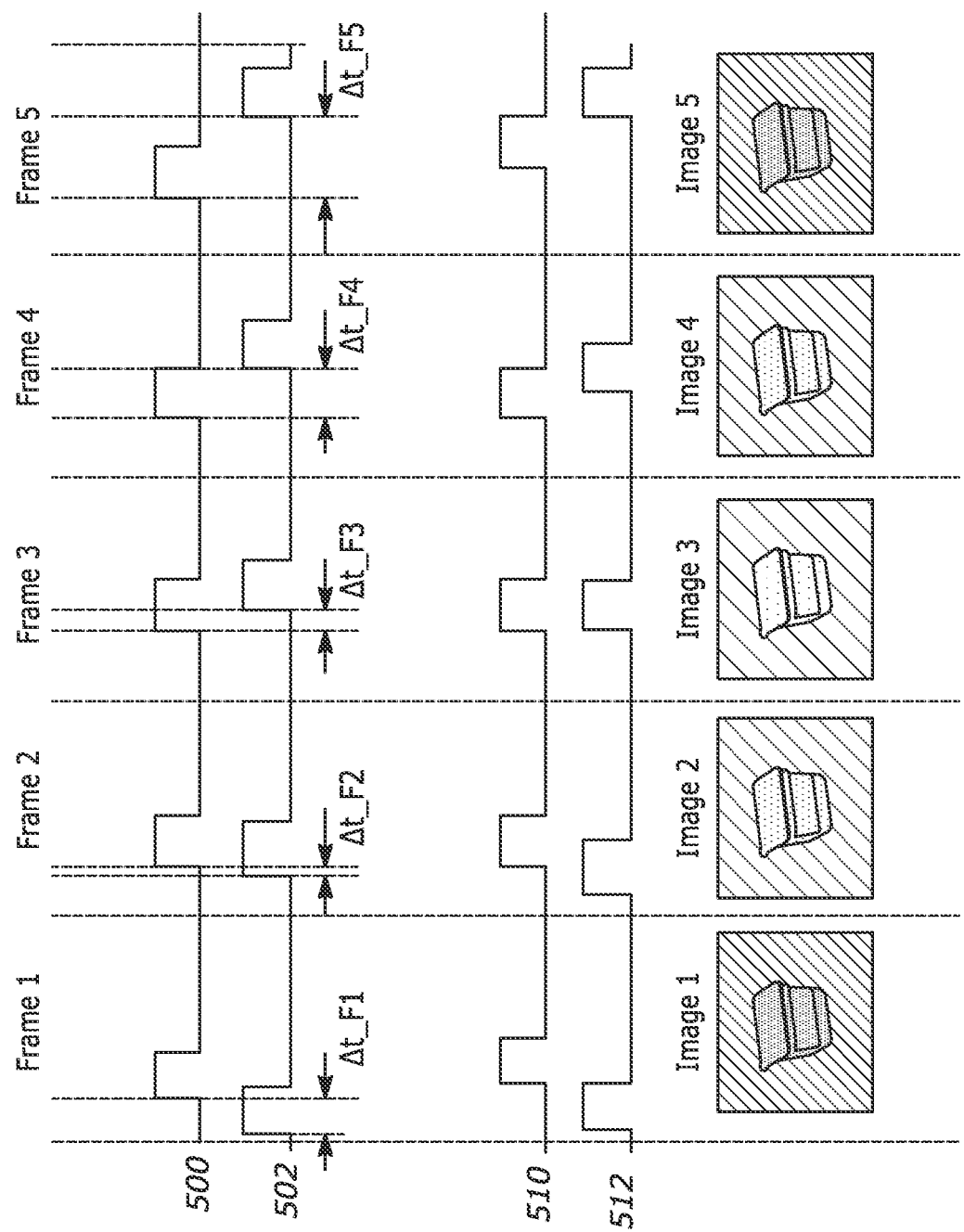
FIG. 5 is an example timing diagram of transmitted exposure and illumination signals and their responses in accordance with embodiments of the present invention.

The tuning application can achieve these results by implementing the exemplary steps outlined in the process flow 400 of FIG. 4. Specifically, the application causes the host to transmit 402, to the imaging assembly, a series of exposure signals causing the imaging assembly to capture a series of frames and to transmit 404, to the illumination assembly, a series of illumination signals causing the illumination assembly to provide the illumination as a series of strobes. As shown in the timing chart of FIG. 5, the series of exposure signals 500 and the series of illumination signals 502 are transmitted on a per-frame basis such that each exposure control pulse has a corresponding illumination control pulse for each frame of the five illustrated frames.

Notably, each exposure control pulse/illumination control pulse pair is transmitted with a respective relative delay between each of those signals. That is, for Frame 1, the illumination pulse is transmitted prior to the transmission of the exposure pulse such that the relative delay between them is expressed as $\Delta t\_F1$. For Frame 2 this relative delay is altered. While the illumination control pulse remains first, the relative delay between them is now reduced to $\Delta t\_F2$. For Frame 3 the delay is once again altered such that the exposure control pulse is transmitted before the illumination control pulse with the relative delay between them now being $\Delta t\_F3$. This delay continues to change with Frames 4 and 5 where it increases to $\Delta t\_F4$ and $\Delta t\_F5$, respectively.

Since it is important to identify whether the illumination pulse or the exposure pulse must be transmitted first, the relative delay may be expressed as a delay of, for example, the illumination pulse to the exposure pulse. This way, illumination pulses transmitted prior to the exposure pulses may be said to have a negative relative delay and those which are transmitted after the exposure pulses may be said to have a positive delay.

In response to the transmission of each exposure control pulse/illumination control pulse pair, the imaging assembly and the illumination assembly are activated as shown via the time pulse plots 510 and 512, respectively, with each frame capturing an image of an environment appearing within the FOV of the imaging assembly. In the example shown, due to the delay introduced by, for example, communication means and between the host and the respective devices, the illumination signal reaches the illumination assembly and causes the illumination assembly to activate prior to the activation of the imaging assembly. However, with the variance of the relative delay between the transmission of the exposure control pulse and the illumination control pulse, it is possible to identify a sufficiently adequate transmission delay that results in the illumination assembly and the imaging assembly activating at a substantially same time. This can be done by evaluating 406 each of the series of images (also referred to as frames) to identify 408 an image having a peak-brightness. Referring to the examples of FIG. 5, it is evident that Images 1 and 5 are relatively dark, Images 2 and 4 are relatively brighter, and Image 3 is the brightest. This occurs because during the capture of Frames 1 and 5, the activation of the illumination assembly is shifted such that there is no overlap between when the exposure of the image sensor occurs and when the illumination is provided. The images get brighter with Images 2 and 3 because approximately half of the time that the image sensor is activated overlaps with the activation of the illumination assembly. Finally, Image 3 is the brightest as the exposure duration and the illumination duration overlap almost or completely entirely.

Given that Image 3 is the brightest from the set of 5 images, it may be designated as the peak-brightness frame with an associated relative delay between the transmission of the exposure control pulse and the transmission of the illumination control pulse being $\Delta t\_F3$. Having this information, it is now possible to tune 410 the vision system such that subsequent image capture operations are performed in a manner where image frames are captured by transmitting the illumination control signal $\Delta t\_F3$ after transmitting the exposure control signal. Operating the vision system with such timing parameters can ensure sufficiently synchronous operation of the sensor exposure and the illumination of light such that no excessive amount of light is wasted outside the exposure period. Thus, future image acquisition jobs having various series of frame captures can be operated with a relative delay of $\Delta t\_F3$ between the transmission of the exposure control pulse and the transmission of the illumination control pulse for each frame of that series.

It is worth noting that to help provide a consistent baseline for image evaluation, the environment that appears within the imaging assembly's FOV should remain static throughout the process outlined in process flow 400. Additionally, to help find a more precise relative delay that would help line up the exposure and illumination during image capture operations, it is preferable to have each exposure duration and each corresponding illumination duration be equal. Also, to allow for proper comparison of brightness levels, exposure duration and illumination duration should preferably be of the same duration.

Notably, it should be appreciated that once the appropriate relative delay has been determined, either or both of the exposure duration and/or the illumination duration may be varied and do not have to remain the same. While the appropriate relative delay will ensure a desired start time to each of the exposure operation and the illumination operation, it is conceivable that, for example, the illumination will not remain active for the entire exposure duration.

Furthermore, it should be appreciated that increasing the number of frames that are evaluated during the process 400 can increase the accuracy of the determined relative delay. However, preferably the starting and ending delays for the series of frames evaluated during process 400 should be large enough ensure the activation of the illumination before and after the exposure period. Under such constraints, sweeping across the various relative delays can help identify the most appropriate delay for the application.

Additionally, it is preferable to avoid illumination/exposure/gain levels which can result in oversaturated images where an excess number of pixels has reached a maximum brightness level. In such instances is may be impossible to discern between multiple relatively bright images, and therefore imaging parameters are preferably adjusted such that only one image from the series of images evaluated pursuant to process 400 had the highest brightness value.

Finally, it should be appreciated that in some cases an initial pass may be made with relatively large differences between the relative time delays. Once a first relative delay has been established through a "coarse scan" a secondary implementation of process 400 may be re-ran with smaller relative delays being considered on both sides (i.e., positive and negative) of the delay identified during the initial run. This can help fine-tune the appropriate delay to ensure a more tight overlap between the triggering of the exposure of the imaging sensor and the triggering of the activation of the illumination assembly.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system, comprising:
a host device having a processor;
an imaging assembly communicatively coupled to the host device, the imaging assembly operable to capture image data representative of an environment appearing within a field of view (FOV) of the imaging assembly;
an illumination assembly communicatively coupled to the host device, the illumination assembly operable to provide illumination over at least a portion of the FOV; and
a memory storing instructions that, when executed by the processors, cause the processors to:
transmit, to the imaging assembly, a series of exposure signals causing the imaging assembly to capture a series of frames;
transmit, to the illumination assembly, a series of illumination signals causing the illumination assembly to provide the illumination as a series of strobes;
evaluate each of the series of frames to identify a peak-brightness frame, the peak-brightness frame having a peak brightness from the series of frames;
determine a peak-brightness illumination signal that corresponds to the peak-brightness frame; and
associate at least one characteristic of the peak-brightness illumination signal with a subsequent activation of the imaging assembly.

2. The system of claim 1, wherein the host device is remote from the illumination assembly.

3. The system of claim 1, wherein each of the series of exposure signals has a corresponding one of the series of illumination signals.

4. The system of claim 3, wherein the each of the series of exposure signals and the corresponding one of the series of illumination signals forms an exposure/illumination signal pair, and
wherein, for each of the exposure/illumination signal pairs, the each of the series of exposure signals and the corresponding one of the series of illumination signals are transmitted with a respective delay relative to each other.

5. The system of claim 4, wherein, for some of the exposure/illumination signal pairs, a transmission of each of the some of the exposure/illumination signal pairs causes the illumination assembly to activate prior to an activation of the imaging assembly, and for some other of the exposure/illumination signal pairs, a transmission of each of the some other of the exposure/illumination signal pairs causes the illumination assembly to activate subsequent to the activation of the imaging assembly.

6. The system of claim 1, wherein the environment includes a static object during a transmission of the series of exposure signals and the series of illumination signals.

7. The system of claim 1, wherein each of the series of exposure signals causes the imaging assembly to expose for approximately same first duration.

8. The system of claim 7, wherein each of the series of illumination signals causes the illumination assembly to illuminate for approximately same second duration.

9. The system of claim 8, wherein the first duration is substantially equal to the second duration.

10. The system of claim 1, wherein the at least one characteristic of the peak-brightness illumination signal includes a determined delay relative to the peak-brightness illumination signal that corresponds to the peak-brightness frame.

11. The system of claim 10, wherein the subsequent activation of the imaging assembly includes:

transmitting, to the imaging assembly, a second series of exposure signals for capturing a second series of frames; and transmitting, to the illumination assembly, a second series of illumination signals for providing a second series of strobes, and wherein, for transmitting each of the second series of exposure signals, one of the second series of illumination signals is transmitted at the determined delay.

12. The system of claim 1, wherein each of the series of frames is captured over a duration such that the each of the series of frames includes less than a predetermined number of saturated pixels.

13. A method for calibrating and/or operating an imaging assembly having an illumination assembly associated therewith, comprising:

transmitting, from a host that is communicatively coupled to the imaging assembly and the illumination assembly, a first exposure control signal to the imaging assembly and a first illumination control signal to the illumination assembly, there being a first time-differential between the transmitting the first exposure control signal and the transmitting the first illumination control signal;

responsive to receiving the first exposure control signal, capturing, by the imaging assembly, a first image data;

transmitting, from the host, a second exposure control signal to the imaging assembly and a second illumination control signal to the illumination assembly, there being a second time-differential between the transmitting the second exposure control signal and the transmitting the second illumination control signal;

responsive to receiving the second exposure control signal, capturing, by the imaging assembly, a second image data;

transmitting, from the host, a third exposure control signal to the imaging assembly and a third illumination control signal to the illumination assembly, there being a third time-differential between the transmitting the third exposure control signal and the transmitting the third illumination control signal, each of the first time-differential, the second time-differential, and the third time-differential being different from each other of the first time-differential, the second time-differential, and the third time-differential;

responsive to receiving the third exposure control signal, capturing, by the imaging assembly, a third image data;

determining which of a first image data, a second image data, and a third image data has a peak-brightness;

responsive to the first image data having the peak-brightness, associating the first time-differential with a set time-differential;

responsive to the first image data having the peak-brightness, associating the first time-differential with the set time-differential;

responsive to the first image data having the peak-brightness, associating the first time-differential with the set time-differential; and transmitting, from the host, a fourth exposure control signal to the imaging assembly and a fourth illumination control signal to the illumination assembly, there being the set time-differential between the transmitting the fourth exposure control signal and the transmitting the fourth illumination control signal.

14. The method of claim 13, wherein the host device is remote from the illumination assembly.

15. The method of claim 13, wherein an environment appearing within a field of view of the imaging assembly remains static across the capturing the first image data, the capturing the second image data, and the capturing the third image data.

16. The method of claim 13, wherein each of the first exposure control signal, the second exposure control signal, and the third exposure control signal causes the imaging assembly to capture, respectively, each of the first image data, the second image data, and the third image data over a same first exposure duration.

17. The method of claim 16, wherein the transmitting the fourth exposure control signal causes the imaging assembly to capture a fourth image data over a second exposure duration.

18. The method of claim 16, wherein each of the first illumination control signal, the second illumination control signal, and the third illumination control signal causes the illumination assembly to emit illumination for a same first illumination duration.

19. The method of claim 18, wherein the transmitting the fourth illumination control signal causes the causes the illumination assembly to emit illumination for a second illumination duration that is different from the first illumination duration.

20. The method of claim 13, wherein each of the first illumination control signal, the second illumination control signal, and the third illumination control signal causes the illumination assembly to, respectively, emit illumination such that each of the first image data, the second image data, and the third image data includes less than a predetermined number of saturated pixels.

21. The method of claim 13, wherein each of the first exposure control signal, the second exposure control signal, and the third exposure control signal causes the imaging assembly to, respectively, capture each of the first image data, the second image data, and the third image data over a duration such that each of the first image data, the second image data, and the third image data includes less than a predetermined number of saturated pixels.

* * * * *